US011435266B2

(12) United States Patent
Akcay et al.

(10) Patent No.: US 11,435,266 B2
(45) Date of Patent: Sep. 6, 2022

(54) TEST SYSTEM FOR THROWING MECHANISMS

(71) Applicant: TUSAS-TURK HAVACILIK VE UZAY SANAYII ANONIM SIRKETI, Ankara (TR)

(72) Inventors: Ali Akcay, Ankara (TR); Onur Imece, Kazan/Ankara (TR); Sabri Senturk, Kazan/Ankara (TR); Nihat Serkan Akcay, Kazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 17/256,117

(22) PCT Filed: Aug. 7, 2019

(86) PCT No.: PCT/TR2019/050661
§ 371 (c)(1),
(2) Date: Dec. 24, 2020

(87) PCT Pub. No.: WO2020/032901
PCT Pub. Date: Feb. 13, 2020

(65) Prior Publication Data
US 2021/0247275 A1  Aug. 12, 2021

(30) Foreign Application Priority Data
Aug. 8, 2018  (TR) .................................. 2018/11495

(51) Int. Cl.
G01M 99/00 (2011.01)

(52) U.S. Cl.
CPC .................................. *G01M 99/005* (2013.01)

(58) Field of Classification Search
CPC .......................... G01M 99/005; G01M 99/008
(Continued)

(56) References Cited

U.S. PATENT DOCUMENTS 2,491,400 A   12/1949  Thumim
3,659,462 A    5/1972  Cole
(Continued)

FOREIGN PATENT DOCUMENTS

| AU | 3798797 A   | 2/1998 |
| CN | 103185659 A | 7/2013 |
| WO | 9802704 A1  | 1/1998 |

OTHER PUBLICATIONS

International Search Report and Written Opinion for corresponding PCT application No. PCT/TR2019/050661, dated Jan. 10, 2020.
(Continued)

*Primary Examiner* — Douglas X Rodriguez
*Assistant Examiner* — Byung Ro Lee
(74) *Attorney, Agent, or Firm* — Notaro, Michalos & Zaccaria P.C.

(57) ABSTRACT

A test system having a chassis, a throwing mechanism that is located at an upper part of the chassis onto which at least one weight is attached and which provides throwing the weight attached thereon; a base that is located at a lower part of the chassis and onto which a weight is thrown by the throwing mechanism; and a control unit that allows the base to be moved closer to the throwing mechanism so as to re-attach the weight to the throwing mechanism, and, by this way, allows testing the throwing mechanism automatically.

12 Claims, 3 Drawing Sheets

(58) Field of Classification Search
USPC .......................................................... 73/865.9
See application file for complete search history.

(56) References Cited

U.S. PATENT DOCUMENTS

| | | | |
|---|---|---|---|
| 5,351,597 A | 10/1994 | Holmstrom et al. | |
| 5,979,426 A * | 11/1999 | Troklus ................ | A63B 69/406 124/78 |
| 6,379,257 B1 * | 4/2002 | Skleba ................. | A63B 47/008 273/129 V |
| 2015/0204638 A1 * | 7/2015 | Frazier ....................... | F41J 9/24 124/6 |

OTHER PUBLICATIONS

International Search Report and Written Opinion for corresponding PCT application No. PCT/TR2019/050661, completed Aug. 26, 2020.

\* cited by examiner

TEST SYSTEM FOR THROWING MECHANISMS

The present invention relates to systems in which life-cycle tests are performed for the throwing mechanisms that provide throwing a weight to a target point.

In order to release or throw ammunition to a target point, throwing mechanisms are utilised in air vehicles. In addition, for various carrying systems, there exist throwing mechanisms that provide holding and releasing or throwing a weight. Life-cycle tests of said throwing systems are generally performed such that a weight is repeatedly attached to the throwing mechanism by manpower.

U.S. Pat. No. 5,351,597A covered by the known art discloses a reliable release system which is able to operate in accordance with different types of ammunition. The system comprises an electronic system with electrical characteristics suitable for different types of ammunition, and an ammunition carrying unit. The ammunition carrying unit comprises an indication unit, wherein the indication unit indicates the ammunition type that is placed at the carrying unit. Said ammunition is released by a control unit which is provided in said system. However, life-cycle test of the ammunition system is not mentioned.

In the known state of the art, life-cycle tests of throwing mechanisms are carried out by manpower. Weight that is thrown out of the throwing mechanism is re-attached to the throwing mechanism by manpower so that the throwing mechanism is operated once again. This process may be repeated over and over. Life-cycle test is performed for the throwing mechanism itself. Performing re-attaching process of the weight to the throwing mechanism by a human causes various work-related accidents, test errors and/or time losses.

Thanks to the test system of the present invention, throwing mechanisms which are used in air vehicles to throw ammunition can be tested independently of the manpower; thus an easy-to-use, practical, effective, efficient and reliable test system is achieved.

Another object of the present invention is to provide a test system for performing life-cycle tests of throwing mechanisms in an automated and controlled manner.

A further object of the present invention is to provide a test system which provides performing tests of throwing mechanisms independently of manpower.

Another object of the present invention is to provide a test system suitable for testing different types of ammunition.

Yet a further object of the present invention is to provide a test system having a simple, easy-to-use, practical, effective, efficient and reliable support mechanism.

Yet another object of the present invention is to provide a simple, easy-to-use, practical, effective, efficient and reliable test system.

The test system for achieving object of the present invention which is defined in the first claim and the dependent claims thereof comprises a chassis; a throwing mechanism which is located at an upper part of the chassis; a weight which is attached to the throwing mechanism for being thrown; a base which is located at a lower part of the chassis and onto which a weight falls; and a control unit which allows the base to be moved upwards so as to re-attach the weight to the throwing mechanism by being pushed by the base, and which, by this way, performs fatigue (life) test automatically (zero-touch) on the throwing mechanism.

The test system of the present invention comprises at least one support mechanism having a plurality of support apparatuses which are located on the chassis so as to be able to move towards or away from the throwing mechanism, which are moved by means of the control unit, which, when the weight is attached to the throwing mechanism, are brought into contact with weight by means of the control unit so that they contact the weight for balancing the weight, one of which is operated by the control unit at a different time than the other one so that one of them contacts the weight before the other one, and between which the weight is provided when each of the support apparatuses contacts the weight so that they push the weight in between for balancing the weight therein.

In an embodiment of the invention, the test system comprises a plurality of motors located on the chassis and a plurality of support apparatuses each of which is actuated by a separate motor.

In an embodiment of the invention, the test system comprises a support mechanism having at least four support apparatuses, two of which are operated simultaneously by the control unit and the other two of which are operated simultaneously by the control unit at a different time.

In an embodiment of the invention, the test system comprises at least two support apparatuses which contact the weight such that they are at an equal distance to the centre of mass of the weight and centre of mass of the weight remains in the middle of support apparatuses.

In an embodiment of the invention, the test system comprises a rod preferably having a cylindrical form, located on the support apparatus, and rotating clockwise around its own axis by being triggered by the motor or counter clockwise around its own axis by being triggered by the motor so that it is able to move towards or away from the weight.

In an embodiment of the invention, the test system comprises a support apparatus whose rotational movement around its own axis ceases upon contact of the pushing member to the weight depending on the torque power of the motor.

In an embodiment of the invention, the test system comprises a weight having an angular form, and support apparatuses contacting the weight from the corners of the weight.

In an embodiment of the invention, the test system comprises a motor, a rod triggered by the motor so as to make a clockwise or counter clockwise radial rotational movement around its own axis, and a support apparatus which has a holding member allows the rod to be able to move along the direction that the rod extends while the rod rotates around its own axis, located on the chassis in a fixed manner, and surrounding the rod.

In an embodiment of the invention, the test system comprises at least one gear path which is located on the rod and/or the holding member and allows the rod to be able to move backwards and forwards along the direction that the rod extends by rotating around its own axis inside the holding member.

In an embodiment of the invention, the test system comprises at least one bearing which is located on the rod in a spherically rotatable manner, extends outwards from the rod and contacts the weight to provide support for balancing the weight.

In an embodiment of the invention, the test system comprises a throwing mechanism which has at least one housing, at least one hook located in the housing, and at least one ring which is located on the weight, extends outwards from the weight and which can be attached to the hook; a weight attached to the throwing mechanism for being thrown; and a bearing which contacts the weight to provide support to the weight by the control unit.

In an embodiment of the invention, the test system is used for testing a throwing mechanism which is used in air vehicles to throw ammunition.

The test system realized to achieve the object of the present invention is illustrated in the attached drawings, in which.

Figure 1:
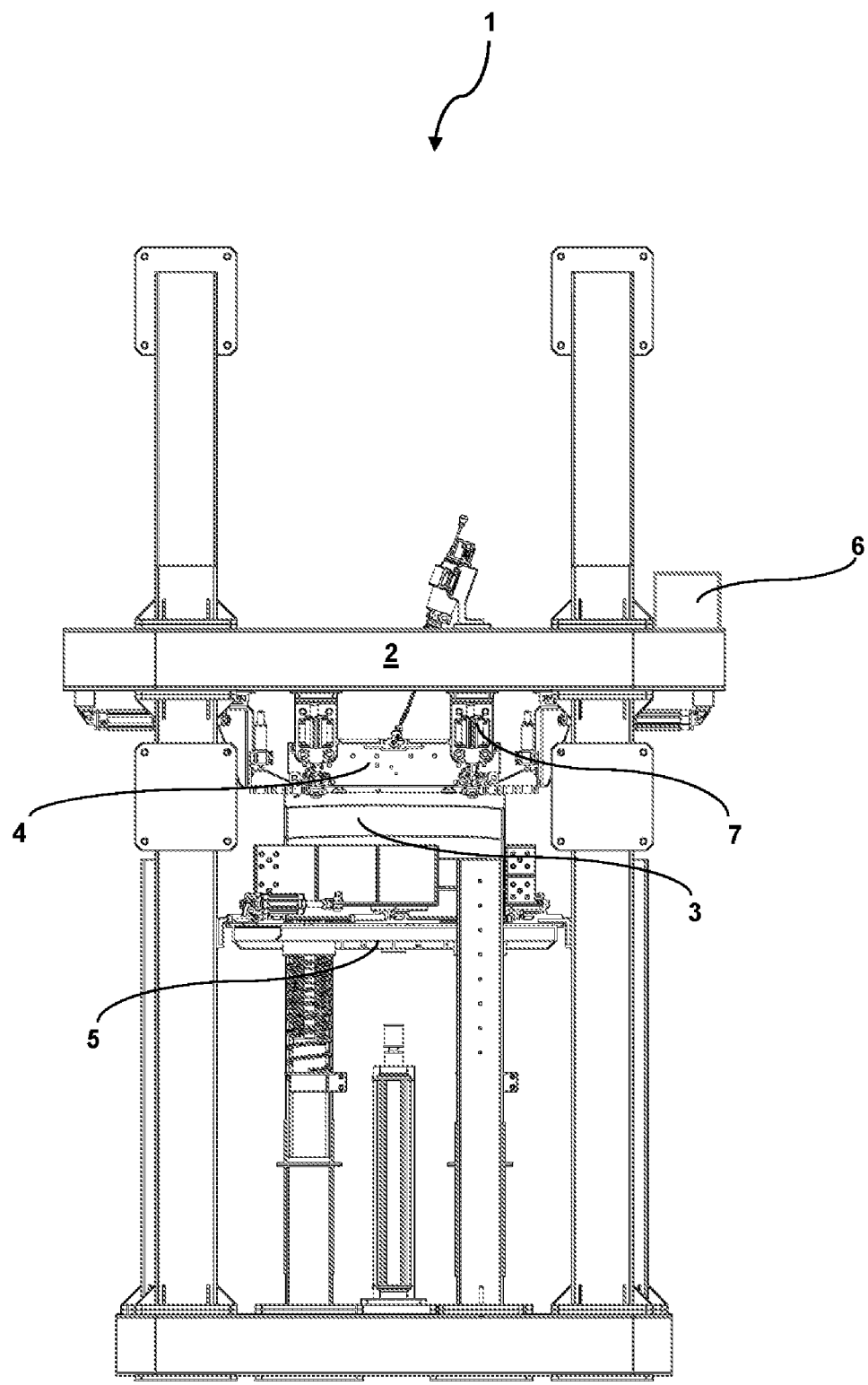
FIG. 1 is a front view of a test system.

All the parts illustrated in figures are individually assigned a reference numeral and the corresponding terms of these numbers are listed below:
1. Test System
2. Chassis
3. Weight
4. Throwing Mechanism
5. Base
6. Control Unit
7. Support Apparatus
8. Support Mechanism
9. Motor
10. Rod
11. Holding member
12. Gear Path
13. Bearing
14. Housing
15. Hook
16. Ring The test system (1) comprises a chassis (2); a throwing mechanism (4) which is located at an upper part of the chassis (2), onto which at least one weight (3) is attached and which provides throwing the weight (3) attached thereon; a base (5) which is located at a lower part of the chassis (2) and onto which a weight (3) is thrown by the throwing mechanism (4); and a control unit (6) which allows the base (5) to be moved closer to the throwing mechanism (4) so as to re-attach the weight (3) to the throwing mechanism (4), and which, by this way, allows the throwing mechanism (4) to be tested automatically.

The test system (1) of the present invention comprises at least one support mechanism (8) having a plurality of support apparatuses (7) which are located on the chassis (2), which extend to the weight (3) by means of the control unit (6) and contact the weight (3) for balancing the weight (3) when the weight (3) is attached to the throwing mechanism (4), and at least one of which is operated by means of the control unit (6) at a different time than the others so that at least one of them contacts the weight (3) at a different time (FIG. 1).

A weight (3) is thrown out of the throwing mechanism (4) by means of the control unit (6). The test system (1) comprises a position adjuster (P) located on the base (5) and allows the position of the weight to be adjusted, which has fallen onto the base (5), such that the weight substantially faces the throwing mechanism (4) and is aligned with the throwing mechanism (4). When the weight (3) falls onto the base (5), its position on the base (5) is changed so that the weight (3) faces the throwing mechanism (4) in order to be re-attached to the throwing mechanism (4) by means of the position adjuster (P). The base (5) is lifted by the control unit (6), thereby re-attaching the weight (3) to the throwing mechanism (4). Throwing the weight (3) out of the throwing mechanism (4) and re-attaching the same to the throwing mechanism (4) is performed repeatedly. Therefore, it is controlled whether the throwing mechanism (4) operates properly. Thus, life-cycle test is performed on the throwing mechanism (4) in a fully automatic way without human intervention.

After the weight (3) which is released and/or thrown out of the throwing mechanism (4) falls onto the base (5), the base (5) is lifted up by means of the control unit (6), and the weight (3) on the base (5) is allowed to be re-attached to the throwing mechanism (4) while the base (5) is being lifted up. Following re-attachment of the weight (3) to the throwing mechanism (4), at least one of the support apparatuses (7) extends towards the weight (3) by means of the control unit (6) in order to support the weight (3) in a direction. After at least one of the support apparatuses (7) contacts the weight (3), another one of the support apparatuses (7) is brought into contact with the weight (3) by means of the control unit (6). By this way, weight (3) remains between at least two support apparatuses (7) and is provided to be balanced. Weight (3), which is balanced at a predetermined position by being pushed by at least two support apparatuses (7), is released and/or thrown downwards out of the throwing mechanism (4) simultaneously with retraction of the support apparatuses again by the control unit (6). Therefore, a life-cycle test is able to be performed efficiently on the throwing mechanism (4) in an automated manner without human intervention. Thanks to the support mechanism (8) located on the chassis (2) and suitable for testing throwing mechanisms (4), a test system (1) is realized which allows a life-cycle test to be tested on various throwing mechanisms (4).

Figure 2:
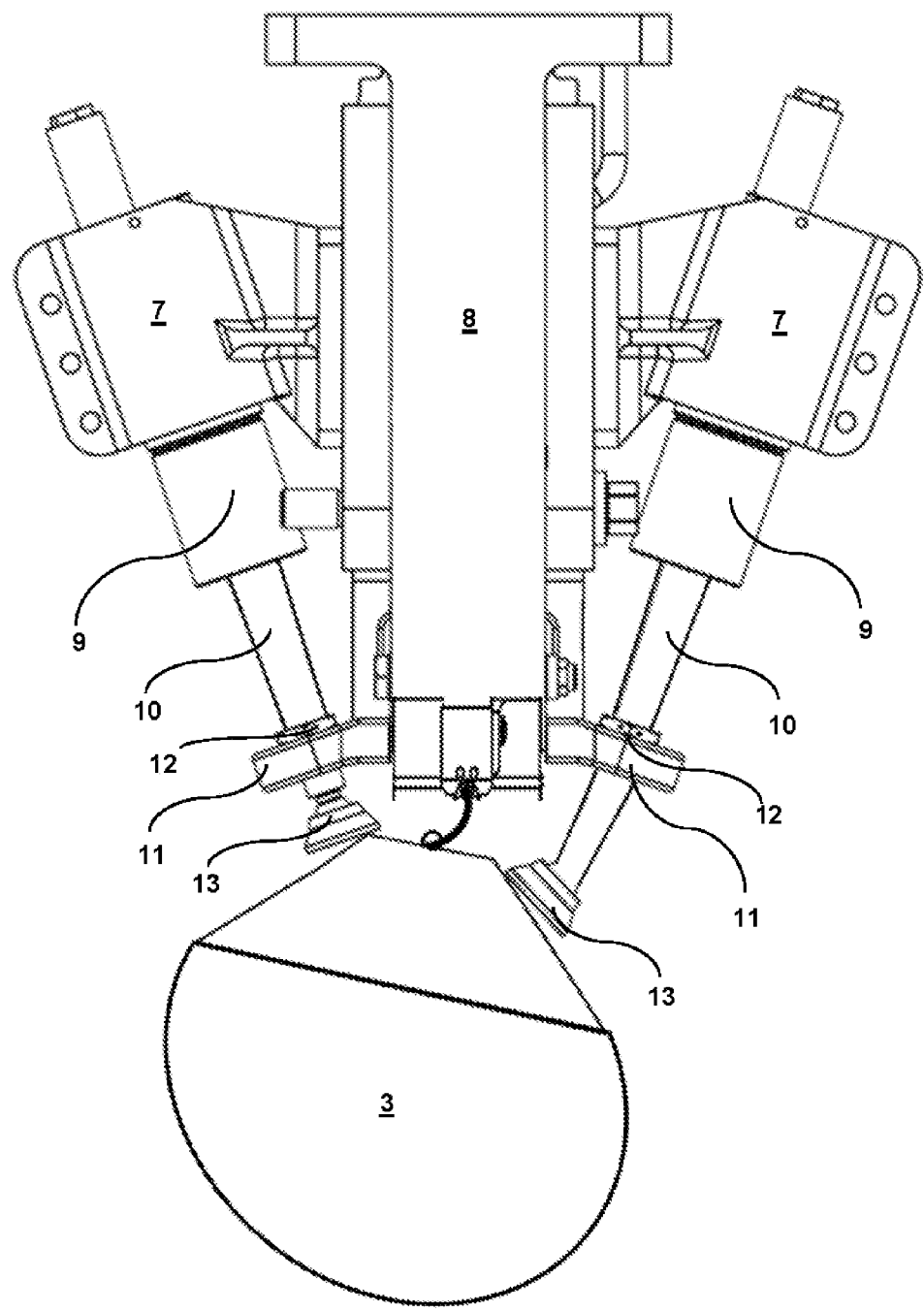
FIG. 2 is a front view of a support mechanism and a weight.

In an embodiment of the invention, the test system (1) comprises a plurality of motors (9) located on the chassis (2) and a plurality of support apparatuses (7) each of which is triggered by a different motor (9). Each of the support apparatuses (7) is triggered by a different motor (9). Control unit (6) is capable of operating the motors (9) individually. Thus, the weight (3) is supported controllably at both sides thereof and held at a predetermined position in a fixed manner (FIG. 2).

In an embodiment of the invention, the test system (1) comprises a support mechanism (8) having support apparatuses (7), two of which are triggered simultaneously and the other two of which are triggered simultaneously at a different time by the control unit (6). By means of the support mechanism (8) comprising two support apparatuses (7) which are located on a wall of the chassis (2) in parallel to each other, and two support apparatuses (7) which are located on another wall of the chassis (2) in parallel to each other, the weight (3) is balanced such that it remains between the support apparatuses (7) from at least four points.

In an embodiment of the invention, the test system (1) comprises support apparatuses (7) which contact the weight (3) such that they are at an equal distance to the centre of mass of the weight (3) and the centre of mass remains in between them. In order for the weight (3) to be balanced efficiently when the weight (3) is attached to the throwing mechanism (4), support apparatuses (7) provide support for the weight (3) by contacting it such that they are at an equal distance to the centre of mass of the weight (3) and cause no additional momentum.

In an embodiment of the invention, the test system (1) comprises a rod (10) located on the support apparatus (7) and rotating around its own axis clockwise or counter clockwise by being triggered by the motor (9) so that it is able to move towards or away from the weight (3). The support apparatus (7) comprises a rod (10) triggered by the motor (9) and providing contact of the support apparatus (7) to the weight (3) by rotating around its own axis. Similarly, the rod (10) which is triggered by motor (9) so as to be able to rotate around its own axis, but this time in an opposite direction, moves away from the weight (3), thus moving the support apparatus (7) away from the weight for releasing or throwing the weight (3) by throwing mechanism (4).

In an embodiment of the invention, the test system (1) comprises a rod (10) whose rotational movement around its own axis terminates upon contacting the weight (3) depending on power of the motor (9). Since frictional force between the support apparatus (7) and weight (3) when the support apparatus (7) contacts the weight (3) is not sufficient to compensate frictional force of torque power of the motor (9), rotational movement of the rod (10) around its own axis terminates upon contact of the support apparatus (7) to the weight (3). Therefore, rotational movement of the rod (10) around its own axis can be stopped upon contact of the support apparatus (7) to the weight (3) depending on the power of motor (9), without requiring any additional stop units or control systems.

Figure 3:
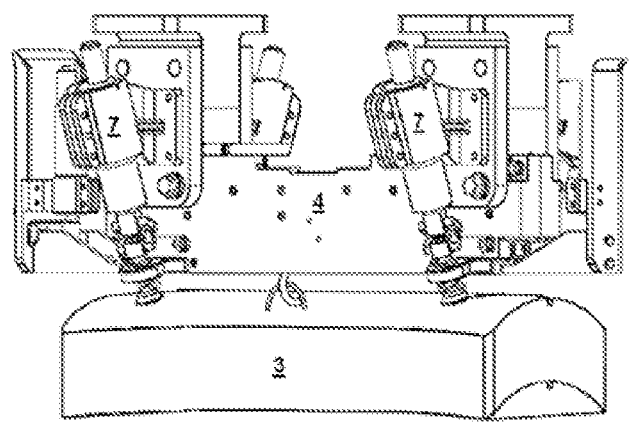
FIG. 3 is a perspective view of support apparatuses, a throwing mechanism and a weight.

In an embodiment of the invention, the test system (1) comprises a weight (3) having an angular form, and support apparatuses (7) contacting the weight (3) from the corners of the weight (3). Support apparatuses (7) contact the corners of the weight (3) to provide balancing the weight (3), wherein the weight (3) has corners in the form of a rectangular prism or the like (FIG. 3).

In an embodiment of the invention, the test system (1) comprises a rod (10) triggered by the motor (9) so that the rod (10) is able to rotate around its own axis, and a support apparatus (7) which has a holding member (11) allowing the rod (10) to be able to move along the direction that the rod (10) extends while the rod (10) rotates around its own axis, surrounding the rod (10) and located on the chassis (2) in a fixed manner. Holding member (11) surrounds the rod (10) nearly in a circular manner in the form of a cylinder. While the rod (10) makes rotational movement around its own axis upon being triggered by motor (9), the rod (10) moves forward along the direction it extends by means of the holding member (11) so that it approaches the weight (3). By this way, support apparatus (7) contacts the weight (3) or is triggered by the motor (9) to move away from the weight (3).

In an embodiment of the invention, the test system comprises at least one gear path (12) which is located on the rod (10) and/or the holding member (11) and allows the rod (10) to move forward along the direction that the rod extends by rotating around its own axis inside the holding member (11). Thanks to the gear path (12) having an inclined structure, the rod (10) can further make linear movement along the direction that it extends by rotating around its own axis.

In an embodiment of the invention, the test system comprises at least one bearing (13) which is located on the rod (10) in a spherically rotatable manner and contacts the weight (3) for supporting the weight (3). The bearing (13) is capable of rotating spherically where it is connected to the rod (10). Thus, the bearing (13) can efficiently contact inclined surfaces of the weight (W).

Figure 4:
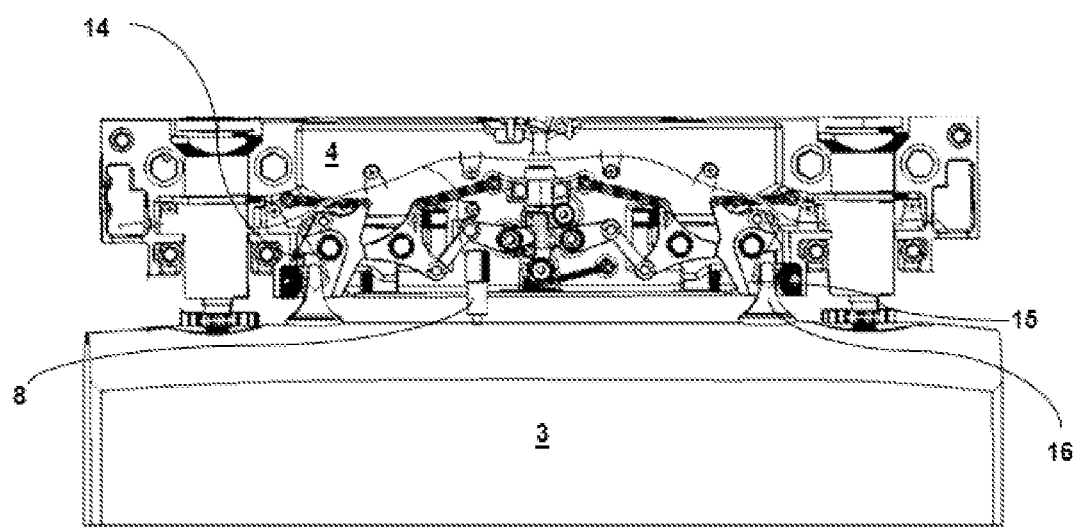
FIG. 4 is a front view of a throwing mechanism and a weight.

In an embodiment of the invention, the test system comprises at least one housing (14) located on the throwing mechanism (4), at least one hook (15) located in the housing (14), and at least one ring (16) which is located on the weight (3), extends outwards from the weight (3) and is held by the hook (15) for allowing the weight (3) to hold on to the throwing mechanism (4). Weight (3) which is located on the base (5) moved upwards by the control unit (6) is attached to the hook (15) via ring (16). Thus, weight (3) is attached to the throwing mechanism (4). When a weight (3) is to be thrown out of the throwing mechanism (4), the hook (15) rotates around its own axis such that it passes from a closed position (C), in which the hook (15) holds the ring (16), to an opened position (O) in which the ring (16) is free. By this way, weight is both attached to and released out of the throwing mechanism (4) easily (FIG. 4).

In an embodiment of the invention, the test system comprises a throwing mechanism (4) suitable for use in air vehicles for throwing weight (3). The throwing mechanism (4) provides releasing and/or throwing a weight (3) of the ammunition type from an air vehicle to a target point.

Thanks to the test system (1) of the present invention, throwing mechanisms (4) which are used to throw weight (3) such as ammunition, etc. can be tested independently of the manpower; thus, an easy-to-use, practical, effective, efficient and reliable test system (1) is achieved.

The invention claimed is:

1. A test system (1) comprising a chassis (2); a throwing mechanism (4) which is located at an upper part of the chassis (2), onto which at least one weight (3) is attached and which provides throwing the at least one weight (3) attached thereon; a base (5) which is located at a lower part of the chassis (2) and onto which the at least one weight (3) is thrown by the throwing mechanism (4); and a control unit (6) which allows the base (5) to be moved closer to the throwing mechanism (4) so as to re-attach the at least one weight (3) to the throwing mechanism (4), and which, by this way, allows the throwing mechanism (4) to be tested automatically, characterized by comprising at least one support mechanism (8) having a plurality of support apparatuses (7) which are located on the chassis (2), which extend to the at least one weight (3) by means of the control unit (6) and contact the at least one weight (3) for balancing the at least one weight (3) when the at least one weight (3) is attached to the throwing mechanism (4), and at least one of the support apparatuses (7) is operated by means of the control unit (6) at a different time than the others of the support apparatuses (7) so that at least one of the support apparatuses (7) contacts the at least one weight (3) at the different time.

2. The test system (1) according to claim 1, characterized by a plurality of motors (9) located on the chassis (2) and the plurality of support apparatuses (7) each of which is triggered by a different motor (9) of the plurality of motors (9).

3. The test system (1) according to claim 1, characterized by the at least one support mechanism (8) having support apparatuses (7), two of which are triggered simultaneously and the other two of which are also triggered simultaneously at a different time by the control unit (6).

4. The test system (1) according to claim 1, characterized by support apparatuses (7) which contact the at least one weight (3) such that they are at an equal distance to the centre of mass of the at least one weight (3) and the centre of mass remains in between them.

5. The test system (1) according to claim 2, characterized by a rod (10) located on the plurality of support apparatuses (7) and rotating around its own axis clockwise or counter clockwise by being triggered by one of the motors (9) of the plurality of motors (9) so that it is able to move towards or away from the at least one weight (3).

6. The test system (1) according to claim 5, characterized by the rod (10) whose rotational movement around its own axis terminates upon contacting the at least one weight (3) depending on power of the one of the motors (9) of the plurality of motors (9).

7. The test system (1) according to claim 1, characterized by the at least one weight (3) having an angular form, and the plurality of support apparatuses (7) contacting corners of the at least one weight (3).

8. The test system (1) according to claim 5, characterized by the rod (10) triggered by one of the motors (9) of the plurality of motors (9) so that the rod (10) is able to rotate around its own axis, and the plurality of support apparatuses (7) which has a holding member (11) allowing the rod (10) to be able to move along the direction that the rod (10) extends while the rod (10) rotates around its own axis, surrounding the rod (10) and located on the chassis (2) in a fixed manner.

9. The test system (1) according to claim 8, characterized by at least one gear path (12) which is located on the rod (10) and/or the holding member (11) and allows the rod (10) to move forward along the direction that the rod (10) extends by rotating around its own axis inside the holding member (11).

10. The test system (1) according to claim 5, characterized by at least one bearing (13) which is located on the rod (10) in a spherically rotatable manner and contacts the at least one weight (3) for supporting the at least one weight (3).

11. The test system (1) according to claim 1, characterized by at least one housing (14) located on the throwing mechanism (4), and at least one ring (16) which is located on the at least one weight (3), extends outwards from the at least one weight (3) for allowing the at least one weight (3) to hold on to the throwing mechanism (4).

12. The test system (1) according to claim 1 suitable for testing the throwing mechanism (4) used in air vehicles for throwing the at least one weight (3).

\* \* \* \* \*